United States Patent [19]

Schuhmacher

[11] Patent Number: 4,968,285
[45] Date of Patent: Nov. 6, 1990

[54] CLEANING ARRANGEMENT FOR COMBINES

[75] Inventor: Ernst Schuhmacher, Homburg-Einod, Fed. Rep. of Germany

[73] Assignee: Deere & Company, Moline, Ill.

[21] Appl. No.: 167,069

[22] Filed: Mar. 10, 1988

[30] Foreign Application Priority Data

Mar. 20, 1987 [DE] Fed. Rep. of Germany ....... 3709242

[51] Int. Cl.⁵ .............................................. A01F 12/44
[52] U.S. Cl. ......................................... 460/97; 460/8
[58] Field of Search ............. 56/14.6; 130/27.2, 27 F, 130/27 T, 27 HE

[56] References Cited

U.S. PATENT DOCUMENTS

| | | | |
|---|---|---|---|
| 945,187 | 1/1910 | Nelson | 130/27.2 |
| 2,732,941 | 1/1956 | Deiss . | |
| 2,750,037 | 6/1956 | Taylor . | |
| 2,875,768 | 3/1959 | Belkowski et al. | 130/27 F |
| 3,115,142 | 12/1963 | Kepkay | 130/27 E |
| 3,247,855 | 4/1966 | Kepkay | 130/27 F |
| 3,536,077 | 10/1970 | Stott et al. | 130/27 T |
| 3,581,746 | 6/1971 | Louks . | |
| 3,847,160 | 11/1974 | De Coene et al. | 130/27 F |
| 3,910,285 | 10/1975 | Sietman . | |
| 3,976,084 | 8/1976 | Weber | 130/27 E |
| 4,303,079 | 12/1981 | Claas et al. | 130/27.2 |
| 4,373,537 | 2/1983 | McNaught | 130/27 E |
| 4,441,511 | 4/1984 | Schroeder | 130/27.2 |

FOREIGN PATENT DOCUMENTS

| | | |
|---|---|---|
| 1199536 | 10/1963 | Fed. Rep. of Germany . |
| 2632569 | 7/1976 | Fed. Rep. of Germany . |
| 3212694 | 4/1982 | Fed. Rep. of Germany . |
| 0091538 | 1/1983 | Fed. Rep. of Germany . |
| 1521157 | 4/1968 | France . |
| 2051542 | 7/1980 | United Kingdom . |

Primary Examiner—Paul J. Hirsch

[57] ABSTRACT

A cleaning arrangement for a combine is equipped with return gutters, inclined and attached to the sides of the cleaning shoe and which serve to capture crop which accumulates on the upper surface of the cleaning shoe, during operation on a slope, and escapes across the side walls of the upper sieve. The crop is conducted by the return gutters to screw conveyors operating in opposite directions which direct the crop to vertical conveyors, which return the crop upstream of the cleaning shoe.

16 Claims, 3 Drawing Sheets

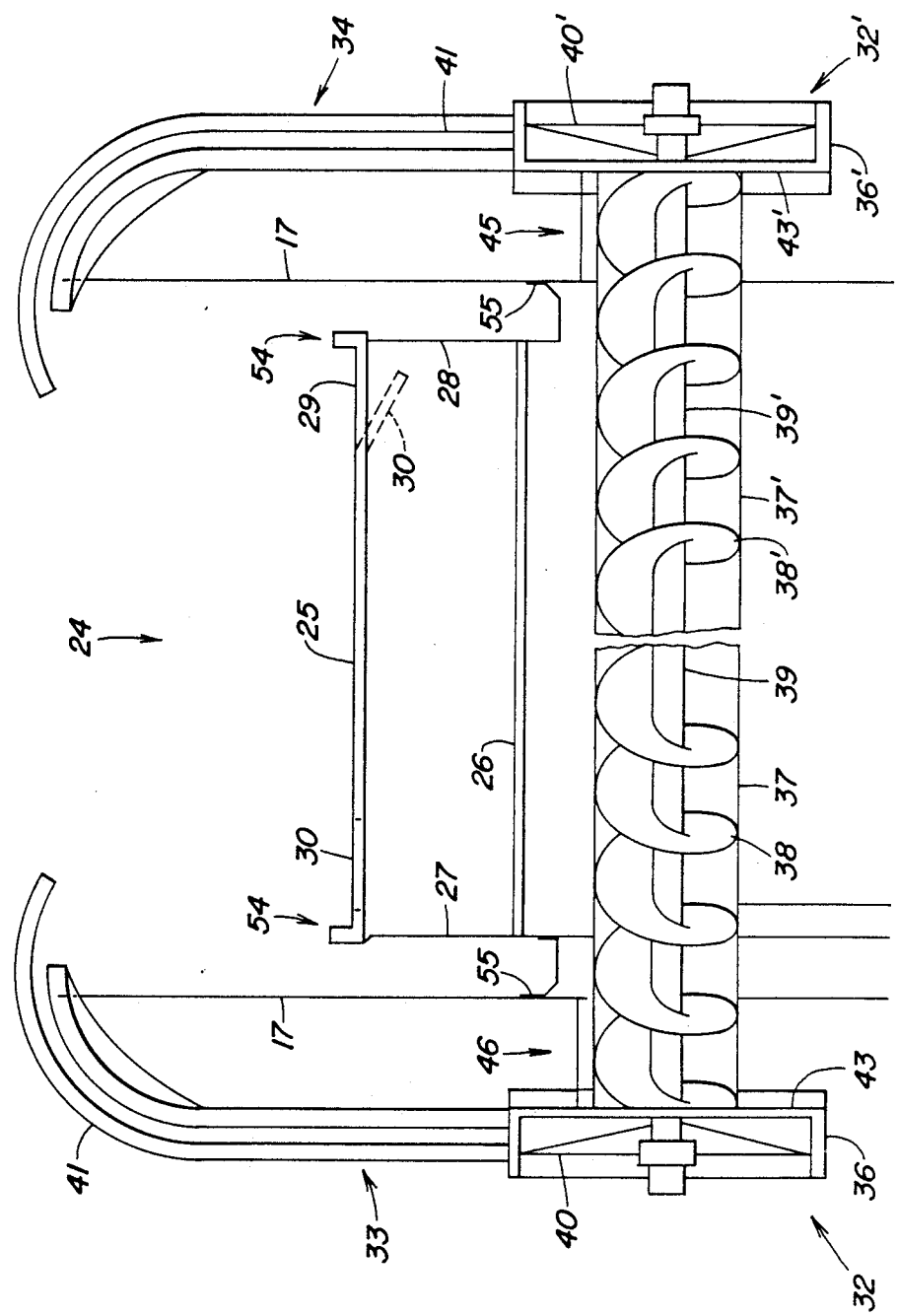

CLEANING ARRANGEMENT FOR COMBINES

BACKGROUND OF THE INVENTION

1. Field of the Invention

The invention is directed to a cleaning arrangement for combines having a cleaning shoe which may be oscillated and which is supplied with an air flow by a cleaning air blower and which consists of an upper and a lower sieve, which is enclosed at its sides by side walls which extends above the upper surface of the shoe.

2. Description of the Prior Art

A known cleaning arrangement for combines is disclosed in U.S. Pat. No. 2,732, 941 and comprises a cleaning shoe with an upper and a lower sieve. The upper sieve of the cleaning arrangement is provided with vertically extended sides which are equipped with adjustable leaves that can be moved towards the inside which attempt to prevent the crop from accumulating on the outside of the upper sieve, during operation of the combine on a slope. Such an arrangement is not always successful since the crop collects on the outside after passing the leaves.

SUMMARY OF THE INVENTION

By contrast, the present invention overcomes this problem by designing and configuring the cleaning arrangement so that during operation of the combine on a side slope the crop accumulated at one side is returned to that point of the cleaning arrangement at which the cleaning process begins. Crop accumulated at one side of the combine operating on a slant is guided to a conveyor arrangement provided either above or below the cleaning shoe which consists of two conveyors operating in opposite directions, which extend perpendicular to the longitudinal direction of the cleaning arrangement and which are connected at each outlet end to a vertical conveyor for the return of the crop. By means of two conveyors operating in opposite directions below the cleaning arrangement, the crop escaping from the upper sieve at the downslope side can be easily captured and returned to the beginning of the cleaning process at the upslope side. By this method, the grain loss of the combine can be kept very low. The two conveyors operating in opposite directions may be configured as screw conveyors, each contained in a screw housing whose total length is greater than the total width of the cleaning shoe so that the inlet opening and the outlet opening of each screw housing are located outside the side enclosure of the sieve box. It is advantageous if the inlet openings of the transverse screw housings are supplied by return gutters provided on the outside of the cleaning shoe, so that the crop can be moved to the vertical conveyor by the transverse screw conveyor, and that the crop can be returned to the inlet area of the upper sieve or the shaker frame, so as to reintroduce the crop to the cleaning process.

It is also possible that outlet openings are provided that can be closed by a flap on the outer side of the cleaning shoe which can return the crop accumulated on the outside of the cleaning shoe to the vertical conveyor by means of the return gutters on the sides. In place of several openings placed one behind the other, a single extended opening may be provided, which is directly connected to the return gutter, so that any crop accumulated on the side can be returned to the transverse conveyor and therewith to the vertical conveyor. The vertical conveyor may be configured as an elevating conveyor or as a high lift conveyor. The two screw conveyors, located next to each other, which extend across the width of the cleaning shoe and which are rotated in opposite directions, are used principally to return the crop from the downslope side return gutter on the side of the cleaning shoe to the other side of the cleaning shoe and to the vertical conveyor. In place of the two screw conveyors driven in opposite directions, it is also possible to provide right hand and left hand screw conveyors, which then are rotated in the same direction.

BRIEF DESCRIPTION OF THE DRAWINGS

FIG. 5 shows a rear view of the return conveyor arrangement according to FIG. 2.

DETAILED DESCRIPTION

Figure 1:
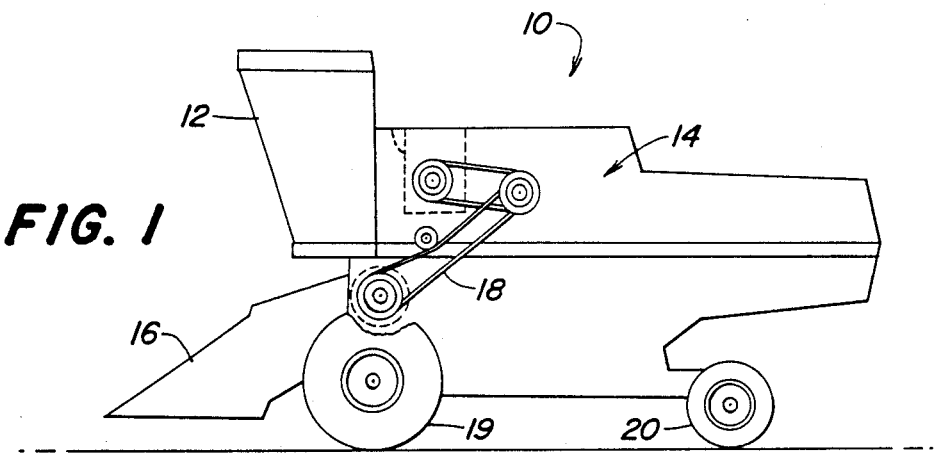
FIG. 1 shows a schematic side view of a combine.
Figure 2:
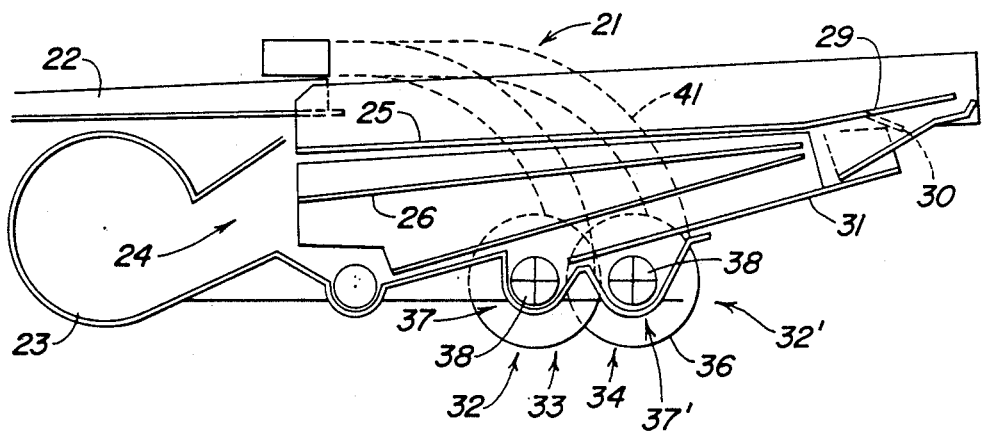
FIG. 2 shows a first embodiment of a return conveyor arrangement consisting of two vertical conveyors located on both sides of the sieve box of the cleaning arrangement.
Figure 3:
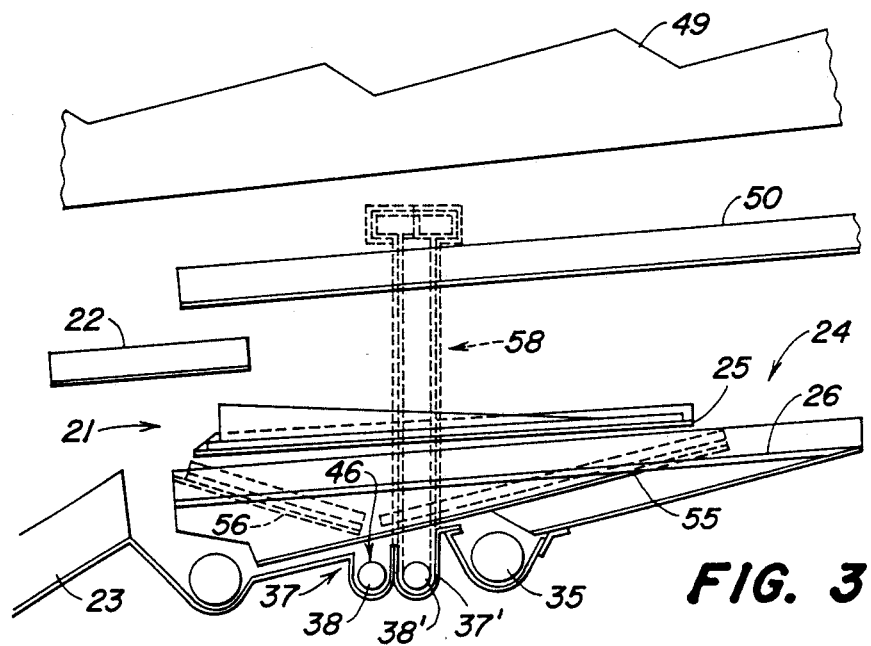
FIG. 3 shows a second embodiment of the return conveyor arrangement with an elevating conveyor.

FIG. 1 shows a combine 10, equipped with an operator's cab 12 and a combine housing 14 located behind the operator's cab 12 and which contains a collection hopper, not shown, and a cleaning arrangement 21 illustrated in FIGS. 2 or 3. Below the operator's cab, a feeder house 16 is located, which can be driven by a drive arrangement 18. The combine is supported by two front driven wheels 19 and rear steerable wheels 20.

Figure 4:
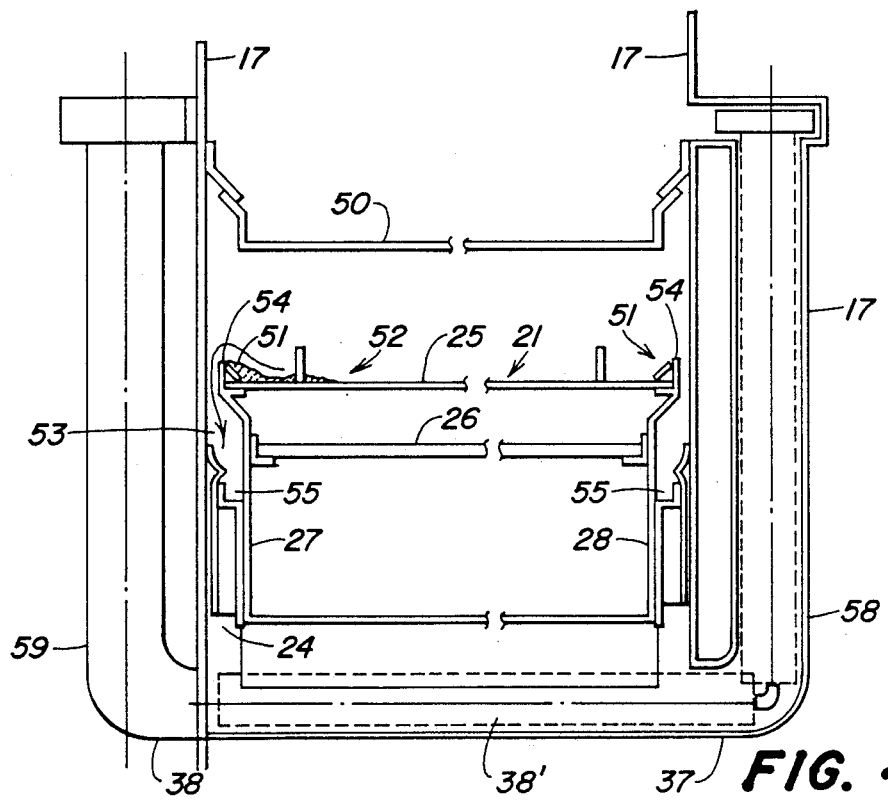
FIG. 4 shows a rear view of the return conveyor arrangement according to FIG. 3.

FIG. 2 shown the first embodiment of a cleaning arrangement 21 which is supplied with crop by a supply chute 22. The cleaning arrangement is enclosed by side walls 17 (FIGS. 4 and 5). According to FIG. 4, the side wall 17 may be located inside an elevating conveyor 59, described in the following, or it may be located outside an elevating conveyor 58 (as shown for the right side of the combine according to FIG. 4). Above the cleaning arrangement 21 and the supply chute 22, a straw walker 49 with a return chute 50 is provided (FIG. 3).

The cleaning arrangement 21 is supplied from the front with cleaning air by means of a cleaning air blower 23. As can be seen from FIG. 4, the cleaning arrangement 21 consists of a cleaning shoe 24 which includes an upper sieve or chaffer 25 and a lower sieve or grain sieve 26 which are enclosed by left and right side walls 27 and 28 connecting the sieves to one another. The upper edge 51 (FIGS. 4 and 5) of side wall 27 or 28 extends above the upper surface of the upper sieve 25, so that, during operation on a slope, the crop does not immediately escape across the upper edge 51 of side wall 27 or 28. If the operation of the combine 10 on a slope permits greater accumulation of crop on the one side of the upper sieve 25, the excess amount of crop can initially escape through outlet openings 29, which may be opened by the flap 30, adjustable according to the degree of the slope of operation of the combine. The outlet openings 29 are preferably located in the rear and in the area of the side wall 27 or 28 of the sieve 25. The flap 30 may be omitted if the outlet openings are located at the extreme rear end of the sieve.

The crop escaping through the outlet openings 29 reaches a right or left vertical conveyor 32 or 32' by means of a sloping chute 31 which delivers the crop to the rear end of the supply chute 22, as described below. The vertical conveyor 32 or 32' includes centrifugal conveyors 33 and 34 to the right and to the left of the side wall 27 or 28. Since the right and left centrifugal conveyors 33 and 34 are identical, only the left rear centrifugal conveyor 34 will here be described in detail (FIGS. 2 and 5). The centrifugal conveyor 34 consists of an impellor housing 36, rigidly attached to a screw housing 37 (the drawing shows only the left half of the screw housing 37). The screw housing 37 encloses a screw conveyor 38 opening towards the left and whose screw conveyor shaft 39 may be supported in bearings located in the side walls 43 of the impellor housing 36. An impeller 40 is mounted on the left end of the screw conveyor shaft 39 and delivers the crop upward through a conveyor pipe 41. The outlet end of the conveyor pipe 41 ends above the outlet end of the supply chute 22 close to its outer edge, so that the crop transported by the centrifugal conveyor is returned to the supply chute hence to the cleaning process. The return gutters 55, 56 are attached to the sides of the side walls 26, 28 and will be described in greater detail below.

In the embodiment according to FIG. 2, the overflow screw conveyor 35 that was shown in FIG. 3 is omitted. The crop escaping through the outlet openings 29 to the rear end of the upper sieve 25 reaches either the left or the right centrifugal conveyor 33 or 34 by way of the chute 31. A part of the crop is delivered to the centrifugal conveyors 33 or 34, by means of return gutters 55 and 56, after escaping across the upper edge 54 of the upper sieve 25 during operation of the combine 10 on a slope. If the combine is operating in its normal attitude, that is, on a horizontal surface, a small portion of the crop, the so-called overflow, will escape through the outlet openings 29 to the end of the sieve and by way of the chute 31 to the screw housing 37 which is provided for this purpose with inlet openings, not shown in the drawing. Accordingly, the centrifugal conveyor 32 or 32' is able to fulfill two functions, it can transport crop delivered by the return gutter 55 or 56, as well as the overflow.

As is shown in FIGS. 2 and 5, next to the forward screw conveyor 38, a second screw conveyor 38' is provided in a second screw housing 37'. The screw conveyor 38', of which only the right half is shown in the drawing, operates in the direction opposite to the screw conveyor 38, so that any crop escaping on the downslope side across the side of the upper sieve 25 will be led to one of the inlet openings 45 or 46 of the corresponding screw housing 37 or 37'. The crop accumulated on the downslope side is moved to the upslope side by the screw conveyors 38 or 38' and hence to the centrifugal conveyors 33 or 34, which returns it to the supply chute 22, as previously described (FIGS. 2 or 3). The centrifugal conveyors 33 and 34 are either driven continuously or may be operated alternately by a control arrangement when crop is delivered to them.

In FIGS. 3 and 4 an additional embodiment of a vertical conveyor is provided, in particular, an elevating conveyor 58 for the crop escaping from one side of the upper sieve 25. In FIGS. 3 and 4, the parts corresponding identically to those of FIGS. 2 and 5 are identified by the same reference number.

FIG. 3 shows a straw walker 49 located above a return chute 50 that moves the crop delivered by the straw walker to the supply chute 22. The supply chute 22 delivers the crop to the cleaning arrangement 21. As shown in FIG. 4, the cleaning arrangement 21 consists of an upper sieve 25 and a lower sieve 26, which are enclosed by the side walls 27 and 28. The side walls 27 and 28 are extended above the upper surface of the upper sieve 25 and are fitted with a sloping cover plate 51, so that the crop 52 can escape, as indicated by arrow 53, over the upper edge 54 of the cover plate 51, when the combine 10 is operating on a slope to the left, and is then captured by the right return gutter 55 or the left return gutter 56. The return gutters 55 and 56 are arranged in a V-shape configuration to each other and are inclined with respect to the plane of support of the combine 10, so that, as seen in FIG. 3, the crop can be conducted to the front or to the rear screw conveyor 38 or 38'. FIG. 3 shows only the return gutters 55 and 56, attached to the left side wall 27 in the direction of travel and which supply the forward screw conveyor 38. The other side wall 28 is equipped with two return gutters that supply the rear screw conveyor 38', when the combine is inclined to the right. The return gutters 55, 56 move the crop through the inlet opening 45 into the screw housing 37, so that the crop accumulating on the downslope side is transported upslope by the screw conveyor 38, which is connected to the elevating conveyor 59. The elevating conveyor 59 moves the crop upward so that it can be returned to the left side of the return chute 50, which then returns it to the supply chute 22, so that the crop can be delivered again to the cleaning process. FIG. 3 shows the rear elevating conveyor 58 with dotted lines, while the elevating conveyor 59, on the other side of the cleaning arrangement is not shown for sake of clarity. If, for example, the combine is sloped towards the left, the crop moves by way of the return gutters 55 and 56 through the inlet opening 46 into the screw housing 37'. The screw conveyor 38' conveys from left to right, and hence in a direction opposite to the screw conveyor 38, so that the crop accumulating on the left side of the cleaning arrangement can be moved through the return gutters 55, 56 to the elevating conveyor 58, which is turn transports the crop to the return chute 50.

The two screw conveyors 38, 38', as shown in FIGS. 3 and 4, may be driven continuously, so that the crop is moved from either the left or the right side of the cleaning arrangement 21 to the opposite side of the cleaning arrangement, depending upon the direction of the slope. This will assure that the crop escaping on the downslope side from the upper sieve 25 is not lost, but can be returned again to the cleaning process, regardless from which side the crop has escaped. In FIGS. 3 and 4, or FIGS. 2 and 5, respectively, two screw conveyors 38, 38' are provided, which operate in opposite directions. It is also possible to provide only one screw conveyor, whose direction of operation is reversible, and which can selectively supply either the right or the left vertical conveyor with crop. For this purpose, the screw conveyor is driven by a reversing gear, which can change the direction of operation of the screw conveyor. According to FIG. 3, the upper end of the elevating conveyor 58, 59 to the supply chute 22 (see FIG. 2) or to extend it to the thresher and separator, so that the crop can be returned to the threshing or separating process.

In both embodiments, the screw conveyors 38, 38' use right hand screws and are driven in opposite directions. It may also be advantageous to use right hand and left hand screws and to drive them in the same direction of rotation.

I claim:

1. A cleaning arrangement for an agricultural combine, comprising:

a cleaning shoe having an upper and lower sieve that are enclosed by two side walls which extend above the upper sieve;

a cleaning blower for directing an air stream to the cleaning shoe; and a conveyor assembly having two horizontal screw conveyors located beneath the cleaning shoe and a vertical conveyor operative coupled to each horizontal conveyor, the two horizontal screw conveyors operate in opposite directions and are arranged in two screw housings, each of the screw housings are provided with an inlet opening and an outlet opening which extend beyond the sides of the cleaning shoe so that crop accumulated on one side of the cleaning shoe is directed to the other side of the cleaning arrangement whereby when the cleaning shoe is inclined, crop accumulating on one side of the cleaning shoe is returned to upstream of the cleaning arrangement, each inlet opening is provided with a collecting element arranged on the side walls of the cleaning shoe.

2. A cleaning arrangement as defined by claim 1 wherein each outlet of the screw housing is operatively coupled to a vertical conveyor, each vertical conveyor is provided with an outlet which extends to a supply chute which directs crop to the cleaning shoe.

3. A cleaning arrangement as defined by claim 1 wherein the vertical conveyors are centrifugal conveyors each having an impellor.

4. A cleaning arrangement as defined by claim 1 wherein the vertical conveyors are elevating conveyors.

5. A cleaning arrangement as defined by claim 1 wherein the two horizontal screw conveyors extend across the cleaning shoe and are arranged in a single plane behind each other.

6. A cleaning arrangement as defined in claim 1 wherein the collection element comprises two return gutters that are inclined in a V-shape towards each other, the return gutters are provided with outlet ends that direct crop to the inlet of the vertical conveyors.

7. A cleaning arrangement as defined by claim 1 wherein the cleaning shoe is provided with an enlarged outlet opening which is opened by flaps during inclination of the cleaning shoe in order to return the crop accumulated at the sides of the cleaning shoe to the conveyor assembly.

8. A cleaning arrangement as defined by claim 7 wherein each outlet opening of the screw conveyors conveys to the impellor of the centrifugal conveyor.

9. An agricultural combine for threshing, separating and cleaning an agricultural crop, comprising:

a vehicle having a frame which is provided with ground engaging means for supporting the vehicle above the ground;

a feeder house extending outwardly from the vehicle for directing the harvested agricultural crop into the vehicle;

a threshing assembly located inside the vehicle for threshing the harvested agricultural crop transported thereto by the feeder house;

a separating assembly located inside the vehicle for separating grain from the straw of the now threshed harvested agricultural crop; and a cleaning arrangement located inside the vehicle which is provided with a cleaning shoe having an upper and lower sieve therein enclosed by two side walls which extend above the upper sieve, a cleaning blower for directing an air stream to the cleaning shoe, and a conveyor assembly having two horizontal screw conveyors located beneath the cleaning shoe and a vertical conveyor operatively coupled to each horizontal conveyor, the two horizontal screw conveyors operating in opposite directions which are arranged in two screw housings, each of the screw housings are provided with an inlet opening and an outlet opening which extend beyond the sides of the cleaning shoe so that crop accumulated on one side of the cleaning shoe is directed to the other side of the cleaning arrangement, whereby when the cleaning shoe is inclined, crop is accumulated on one side of the cleaning shoe and returned to upstream of the cleaning arrangement, each inlet opening is provided with a collecting element arranged on the side walls of the cleaning shoe.

10. An agricultural combine as defined by claim 9 wherein each outlet of the screw housing is operative coupled to a vertical conveyor, each vertical conveyor is provided with an outlet which extends to a supply chute which directs crop to the cleaning shoe.

11. An agricultural combine as defined by claim 9 wherein the vertical conveyors are centrifugal conveyors each having an impellor.

12. An agricultural combine as defined by claim 9 wherein the vertical conveyors are elevating conveyors.

13. An agricultural combine as defined by claim 9 wherein the two horizontal screw conveyors extend across the cleaning shoe and are arranged in a single plane behind each other.

14. An agricultural combine as defined by claim 9 wherein the collection element comprises two return gutters that are inclined in a V-shape towards each other, the return gutters are provided with outlet ends that direct crop to the inlet of the vertical conveyor.

15. An agricultural combine as defined by claim 9 wherein the cleaning shoe is provided with an enlarged outlet opening which is opened by flaps during inclination of the cleaning shoe in order to return the crop accumulated at the sides of the cleaning shoe to the conveyor assembly.

16. An agricultural combine as defined in claim 11 wherein each outlet opening of the screw conveyors conveys to the impellor of the centrifugal conveyor.

* * * * *

UNITED STATES PATENT AND TRADEMARK OFFICE
CERTIFICATE OF CORRECTION

PATENT NO. : 4,968,285

DATED : 6 November 1990

INVENTOR(S) : Ernst Schuhmacher

It is certified that error appears in the above-identified patent and that said Letters Patent is hereby corrected as shown below:

Column 5, line 53, delete "7" and insert therefor -- 3 -- .

Signed and Sealed this

Twenty-first Day of April, 1992

Attest:

HARRY F. MANBECK, JR.

*Attesting Officer*      *Commissioner of Patents and Trademarks*